United States Patent
Fries

(10) Patent No.: US 8,924,930 B2
(45) Date of Patent: Dec. 30, 2014

(54) VIRTUAL MACHINE IMAGE LINEAGE

(75) Inventor: Robert Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 13/171,333

(22) Filed: Jun. 28, 2011

(65) Prior Publication Data

US 2013/0007731 A1 Jan. 3, 2013

(51) Int. Cl.
G06F 9/44 (2006.01)
G06F 9/455 (2006.01)

(52) U.S. Cl.
CPC .. *G06F 9/45558* (2013.01); *G06F 2009/45591* (2013.01)
USPC ............................ 717/120; 717/101; 717/102

(58) Field of Classification Search
None
See application file for complete search history.

(56) References Cited

U.S. PATENT DOCUMENTS

| | | | | |
|---|---|---|---|---|
| 6,332,217 | B1 * | 12/2001 | Hastings | 717/178 |
| 6,601,233 | B1 * | 7/2003 | Underwood | 717/101 |
| 6,718,535 | B1 * | 4/2004 | Underwood | 717/120 |
| 6,961,931 | B2 * | 11/2005 | Fischer | 717/168 |
| 6,990,660 | B2 * | 1/2006 | Moshir et al. | 717/171 |
| 7,080,351 | B1 * | 7/2006 | Kirkpatrick et al. | 717/102 |
| 7,133,894 | B2 * | 11/2006 | Banerjee et al. | 709/203 |
| 7,257,584 | B2 | 8/2007 | Hirschfeld | |
| 7,735,077 | B2 * | 6/2010 | Laird | 717/170 |
| 7,823,153 | B1 | 10/2010 | Pashenkov | |
| 8,065,689 | B2 * | 11/2011 | Sia et al. | 719/327 |
| 8,176,464 | B2 * | 5/2012 | Ponnath | 717/101 |
| 8,185,889 | B2 * | 5/2012 | Kinder et al. | 717/174 |
| 8,205,194 | B2 * | 6/2012 | Fries et al. | 717/168 |
| 8,225,281 | B1 * | 7/2012 | Hardinger et al. | 717/120 |
| 8,255,362 | B2 * | 8/2012 | Johnson et al. | 707/625 |
| 8,291,402 | B2 * | 10/2012 | Pazdziora | 717/168 |
| 8,347,263 | B1 * | 1/2013 | Offer | 717/104 |
| 8,401,928 | B2 * | 3/2013 | Herrmann et al. | 717/102 |
| 8,464,207 | B2 * | 6/2013 | Pouliot | 717/102 |
| 8,484,160 | B2 * | 7/2013 | Kumar et al. | 707/634 |
| 8,490,076 | B2 * | 7/2013 | Wolf et al. | 717/170 |
| 8,660,878 | B2 * | 2/2014 | Bernardini et al. | 717/101 |
| 8,677,315 | B1 * | 3/2014 | Anderson et al. | 717/120 |

(Continued)

OTHER PUBLICATIONS

Bjerke, et al., "Tools and Techniques for Managing Virtual Machine Images", 2009 Springer-Verlag; [retrieved on Oct. 2, 2013]; Retrieved from Internet <URL: http://link.springer.com/chapter/10.1007/978-3-642-00955-6_2#>; pp. 3-12.*

(Continued)

*Primary Examiner* — Xi D Chen
(74) *Attorney, Agent, or Firm* — Kate Drakos; Jim Sfekas; Micky Minhas

(57) ABSTRACT

Techniques are described for tracking and maintaining the lineage of virtual machines (VMs). As applications are built or compiled, information about the makeup or elements of the applications is captured. As applications are installed on VMs, that information is also captured. As the VMs are deployed to hosts, decommissioned, migrated between hosts, etc., that information is also maintained. Therefore, it is possible to trace relations between live VMs (and/or hosts they execute on) and the elements of applications installed on the VMs. For example, if an element is a source code file, it may be possible to link that source code file with particular hosts or VMs. Or, it may be possible to determine whether a given host or VM has a dependency on an application element. Given a dataset of lineage information, a wide range of previously unavailable information can be obtained.

19 Claims, 8 Drawing Sheets

(56) References Cited

U.S. PATENT DOCUMENTS

| | | | |
|---|---|---|---|
| 8,677,319 B2* | 3/2014 | Clemm et al. | 717/122 |
| 8,694,969 B2* | 4/2014 | Bernardini et al. | 717/101 |
| 8,756,568 B2* | 6/2014 | Hale et al. | 717/120 |
| 2003/0182652 A1* | 9/2003 | Custodio | 717/122 |
| 2005/0114829 A1* | 5/2005 | Robin et al. | 717/101 |
| 2007/0198519 A1 | 8/2007 | Dice | |
| 2007/0283324 A1* | 12/2007 | Geisinger | 717/120 |
| 2008/0127074 A1* | 5/2008 | Berman | 717/120 |
| 2008/0189697 A1* | 8/2008 | Kachroo et al. | 717/171 |
| 2009/0070734 A1* | 3/2009 | Dixon et al. | 717/102 |
| 2009/0164994 A1 | 6/2009 | Vasilevsky | |
| 2009/0182928 A1 | 7/2009 | Becker | |
| 2010/0011178 A1* | 1/2010 | Feathergill | 711/162 |
| 2010/0235807 A1* | 9/2010 | Doddappa et al. | 717/101 |
| 2011/0179413 A1* | 7/2011 | Subramanian et al. | 718/1 |
| 2011/0296390 A1* | 12/2011 | Vidal et al. | 717/168 |
| 2012/0054733 A1* | 3/2012 | Vidal et al. | 717/171 |

OTHER PUBLICATIONS

Li, et al., "Enableing Datacenter Servers to Scale Out Economically and Sustainably", 2013 ACM; [retrieved on Aug. 17, 2014]; Retrieved from Internet <URL:http://dl.acm.org/citation.cfm?id=2540708>;pp. 322-333.*

Barker, Shenoy, "Empirical Evaluation of Latency-sensitive Application Performance in the Cloud"; 2010 ACM;[retrieved on Aug. 17, 2014]; Retrieved from Internet <URL:http://dl.acm.org/citation.cfm?id=1730836>;pp. 35-46.*

Jeswani, et al., "ImageElves: Rapid and Reliable System Updates in the Cloud"; 2013 IEEE; [retrieved on Aug. 18, 2014]; Retrieved from Internet <URL:http://ieeexplore.ieee.org/stamp/stamp.jsp?tp=&arnumber=6681608>;pp. 390-399.*

Huang, et al., "Minimizing Latency in Fetching Virtual Machine Images Based on Multi-Point Collaborative Approach"; 2013 IEEE; [retrieved on Aug. 18, 2014]; Retrieved from Internet <URL:http://ieeexplore.ieee.org/stamp/stamp.jsp?tp=&arnumber=6682076>;pp. 262-267.*

Run IT on a Virtual Hard Disk—Test Drive Program Date Published Apr. 5, 2009.

VS 2010 Package Development—Chapter 1: Visual Studio Packages Author: Inovak Date Published Mar. 2, 2010.

The Windows Azure Programming Model Author: Vikas Sahni Date Published Nov. 14, 2010.

\* cited by examiner

VIRTUAL MACHINE IMAGE LINEAGE

BACKGROUND

Recently, software has been run in virtualized hardware environments called virtual machines (VMs). A VM may have a virtual disk image that functions as a virtual hard drive. That is, the VM image (VMI) is a file that a virtualization layer may use to boot a VM, may contain a guest operating system and other software to run within the operating system. A VMI may be duplicated and each duplicate may serve as the virtual disk for its own VM instance. In other words, there may be many VMs running respective copies of a same VMI. Therefore, these VMs are likely running at least some of the same software found on the original VMI.

A problem, not previously appreciated, is that there has been no way to conveniently understand which VMs currently have which pieces of software, which hosts of VMs are linked to which source code files (of applications thereon), and so forth. While it may be possible to manually examine a VMI and identify software installed therein, there is no systematic way to accomplish this in an environment where software is often recompiled and reinstalled on VMIs, and where VMs using the VMIs are constantly deployed, redeployed, deleted, instantiated, etc. For example, in a cloud hosting environment or a data center, in response to current network of computing conditions, or in response to changing user requirements, new VM instances (having specific target software) may be created and started, old VM instances may be shut down, and/or VM instances (and their VMIs) may be moved from one host to another host. Persons interested in a particular software application may not be able to quickly assess exactly which hosts are running which pieces of the software. Similarly, persons managing the cloud or data center may, for diagnostic or performance reasons, desire to know which software is on which hosts.

Moreover, detailed information about the software on VMs may be limited. For example, it may at times be desirable to know exactly which source code files contributed to the software installed on a VM/VMI. Where VMs have been employed, there has been no way to quickly obtain answers to questions such as "which hosts currently have VMs with software built from source code file F?", or "which source code files contributed to the VM-based software on host H?"

Techniques related to tracking VM-software lineages are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described for tracking and maintaining the lineage of virtual machines (VMs). As applications are built or compiled, information about the makeup or elements of the applications is captured. As applications are installed on VMs, that information is also captured. As the VMs are deployed to hosts, decommissioned, migrated between hosts, etc., that information is also maintained. Therefore, it is possible to trace relations between live VMs (and/or hosts they execute on) and the elements of applications installed on the VMs. For example, if an element is a source code file, it may be possible to link that source code file with particular hosts or VMs. Or, it may be possible to determine whether a given host or VM has a dependency on an application element. Given a dataset of lineage information, a wide range of previously unavailable information can be obtained.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Virtualization Overview

Figure 1:
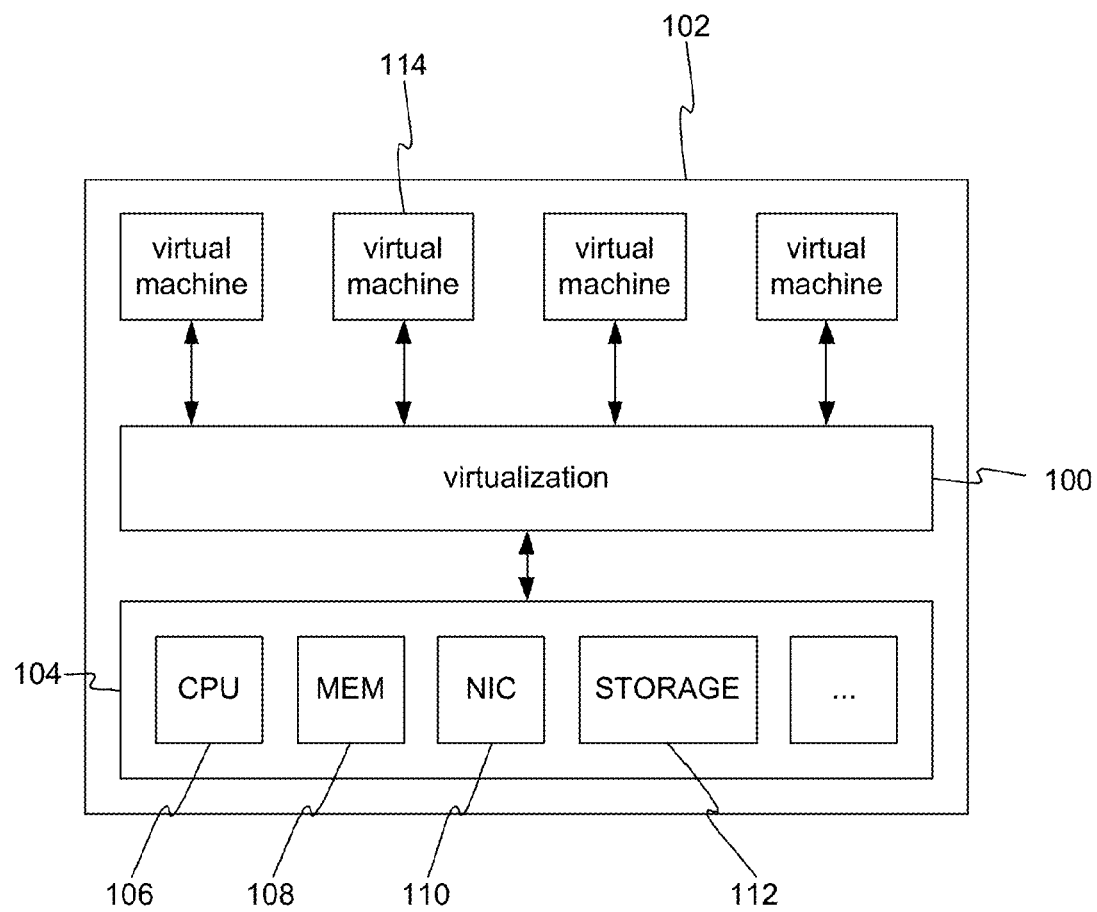
FIG. 1 shows an example virtualization layer 100.

FIG. 1 shows an example virtualization layer 100. A computer 102 has hardware 104, including a central processing unit (CPU) 106, memory 108, a network interface 110, non-volatile storage 112, and other components not shown, such as a bus, a display adapter, etc. The virtualization layer 100 manages and facilitates execution of virtual machines 114. Although not shown in FIG. 1, each virtual machine 114 typically has an associated virtual disk image (VMI mentioned above) and a guest operating system. For brevity, the operating system and perhaps application software of a virtual machine 114 will sometimes be referred to as a guest, which is stored and executed from the virtual disk image associated with the virtual machine 114.

The virtualization layer 100 may be of any variety of known or future implementations, such as Hyper-V Server™, VMWare ESX Server™, Xen, Oracle VM™, etc. The architecture of the virtualization layer may a hosted type, with a virtual machine monitor (VMM) running on a host operating system, or a bare-metal type with a hypervisor or the like running directly on the hardware 104 of the computer 102. As used herein, the term "virtual machine" refers to a system-type virtual machine that simulates any specific hardware architecture (e.g., x86) able to run native code for that hardware architecture; to the guest, the virtual machine may be nearly indistinguishable from a hardware machine. Virtual machines discussed herein are not abstract or process-type virtual machines such as Java Virtual Machines.

The virtualization layer 100 performs the basic function of managing the virtual machines 114 and sharing of the hardware 104 by both itself and the virtual machines 114. Any of a variety of techniques may be used to isolate the virtual machines 114 from the hardware 104. In one embodiment, the virtualization layer may provide different isolated environments (i.e., partitions or domains) which correspond to virtual machines 114. Some of the virtualization layer 100 such as shared virtual device drivers, inter virtual machine communication facilities, and virtual machine management APIs (application programming interfaces), may run in a special privileged partition or domain, allowing for a compact and efficient hypervisor. In other embodiments, functionality for virtual machine management and coherent sharing of the hardware 104 may reside in a monolithic on-the-metal hypervisor.

Figure 2:
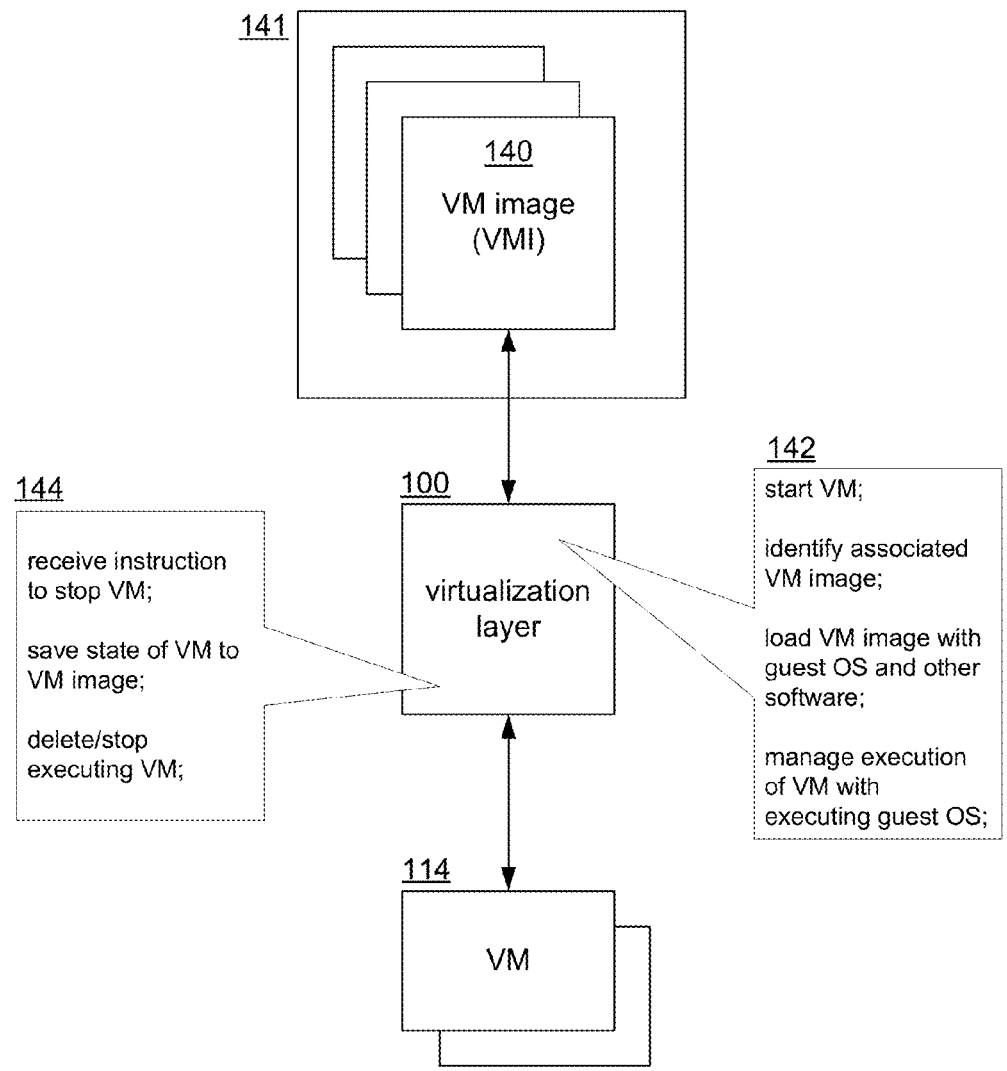
FIG. 2 shows processes and interactions of virtualization layer in relation to virtual machines and virtual machine images.

FIG. 2 shows processes and interactions of virtualization layer 100 in relation to virtual machines 114 and virtual machine images 140. The virtualization layer 100 performs a process 142 of starting and executing a virtual machine 114, possibly according to corresponding virtual machine configuration parameters. When a virtual machine 114 (VM) is started, the virtualization layer identifies an associated virtual machine image 140. In practice, any virtual machine image 140 can be used by any virtual machine 114. The virtual machine image 140 may be a specially formatted file (e.g., a VHD) on a file system 141 of the virtualization layer 100. The virtualization layer 100 loads the identified virtual machine image 140. The started virtual machine 114 mounts and reads the virtual machine image 140, perhaps seeking a master boot record or other boot information, and boots a guest operating system which begins executing.

The virtualization layer 100 manages execution of the virtual machine 114, handling certain calls to the guest's kernel, hypercalls, etc., and coordinating the virtual machine 114's access to the underlying hardware 104. As the guest operating system (sometimes called "guest") and its software run, the virtualization layer 100 may maintain state of the guest on the virtual disk image 140; when the guest, or an application run by the guest, writes data to "disk", the virtualization layer 100 translates the data to the format of the virtual disk image 140 and writes to the image.

The virtualization layer 100 may perform a process 144 for shutting down the virtual machine 114. When an instruction is received to stop the virtual machine 114, the state of the virtual machine 114 and its guest is saved to the virtual disk image 140, and the executing virtual machine 114 process (or partition) is deleted. A specification of the virtual machine 114 may remain for a later restart of the virtual machine 114.

Software Deployed to Virtual Machines

Figure 3:
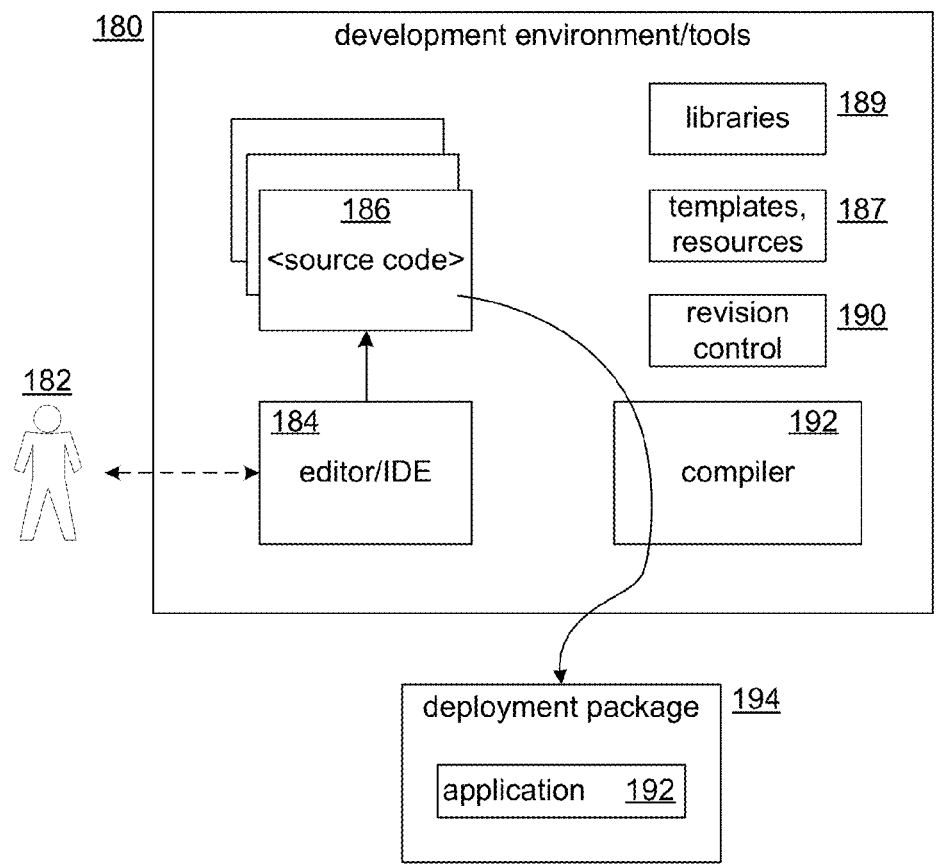
FIG. 3 shows an example system for building and deploying software.

FIG. 3 shows an example system for building and deploying software. Systems for building software may range from loose collections of tools such as editors and compilers to sophisticated development environments. Development environment 180 is only an example mentioned for explanation. A developer 182 uses an editor 184 or integrated development environment (IDE) to develop and edit source code files 186, possibly starting from templates in a resource library 187. A program or project may incorporate the source code files 186, as well as other files such as assemblies or libraries from a set of libraries 189, resource such as images or documents, and so forth. As used herein, the pieces that may go in to building an application, program, executable, etc., will be referred to as application elements, which is deemed to refer to source code files 186 and resources typically installed with and used by an application such as images, documents, HTML (hypertext markup language) files, libraries or assemblies (or references thereto), and other units of information used in building/compiling an application (application will refer to any type of software built from application elements, including, for example, database servers, operating systems, network services, etc.). Such resources may even be incorporated, in whole or by reference, within executable files compiled from the source code files 186.

In practice, the developer 182 writes programming language source code (e.g., Java code, C++ code, C# code, markup/declarative language code, etc.) in a programming language and source code is stored in the source code files 186. The source code files may be managed by a revision control system 190. A compiler 192 then compiles the source code files 186, forming one or more executable files or programs (application 192), possibly packaged in a deployment package 194 or the like. Again, the system of FIG. 3 is used only for an example. The lineage-tracking techniques described herein may also be used to track source code that is interpreted; no compiling or deployment packages are used. For example, the application 192 may be in the form of one or more script files that are written and installed as-is on VMIs (where there are executed by an interpreter), XML files with declarative code such as XaML (extensible application markup language), and other forms of applications comprised of or built from programming language code. As will be discussed next, the generic application 192 may be installed in VMIs and run in VMs.

Figure 4:
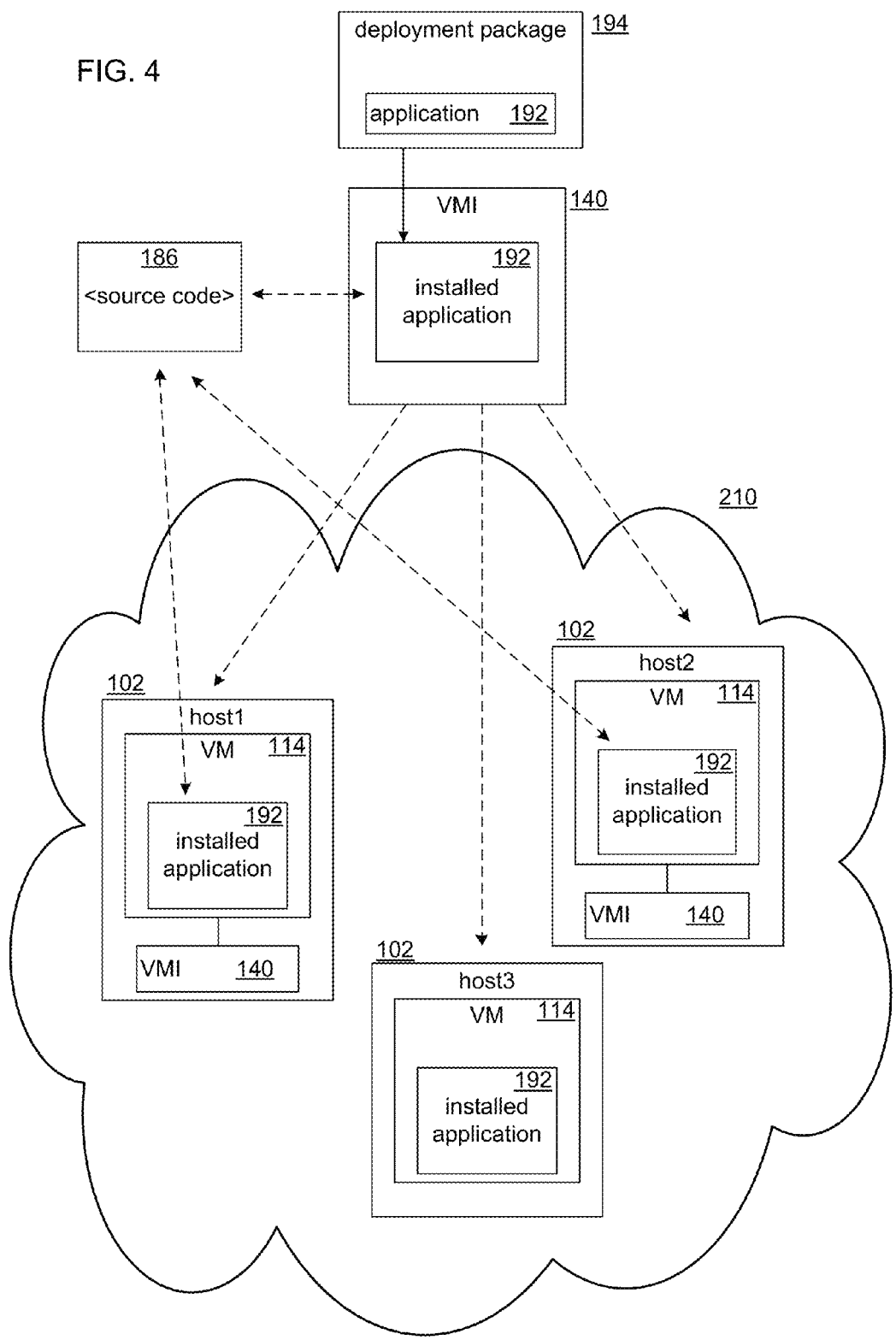
FIG. 4 shows am application installed on a virtual machine image (VMI), which is deployed to hosts.

FIG. 4 shows the application 192 installed on a virtual machine image (VMI) 140, which is deployed to hosts 102 (e.g., hardware computer servers). VMs 114 boot and run using the VMIs 140. The VMIs may be deployed to the hosts 102 via a network 210. As the VMs 114 run, the application 192 may run therein. As such, there is a logic chain or lineage going from the developer 182, to the source code files 186, to the VMIs 140, to the hosts 102, and to the VMs 114.

VM Lineage

Figure 5:
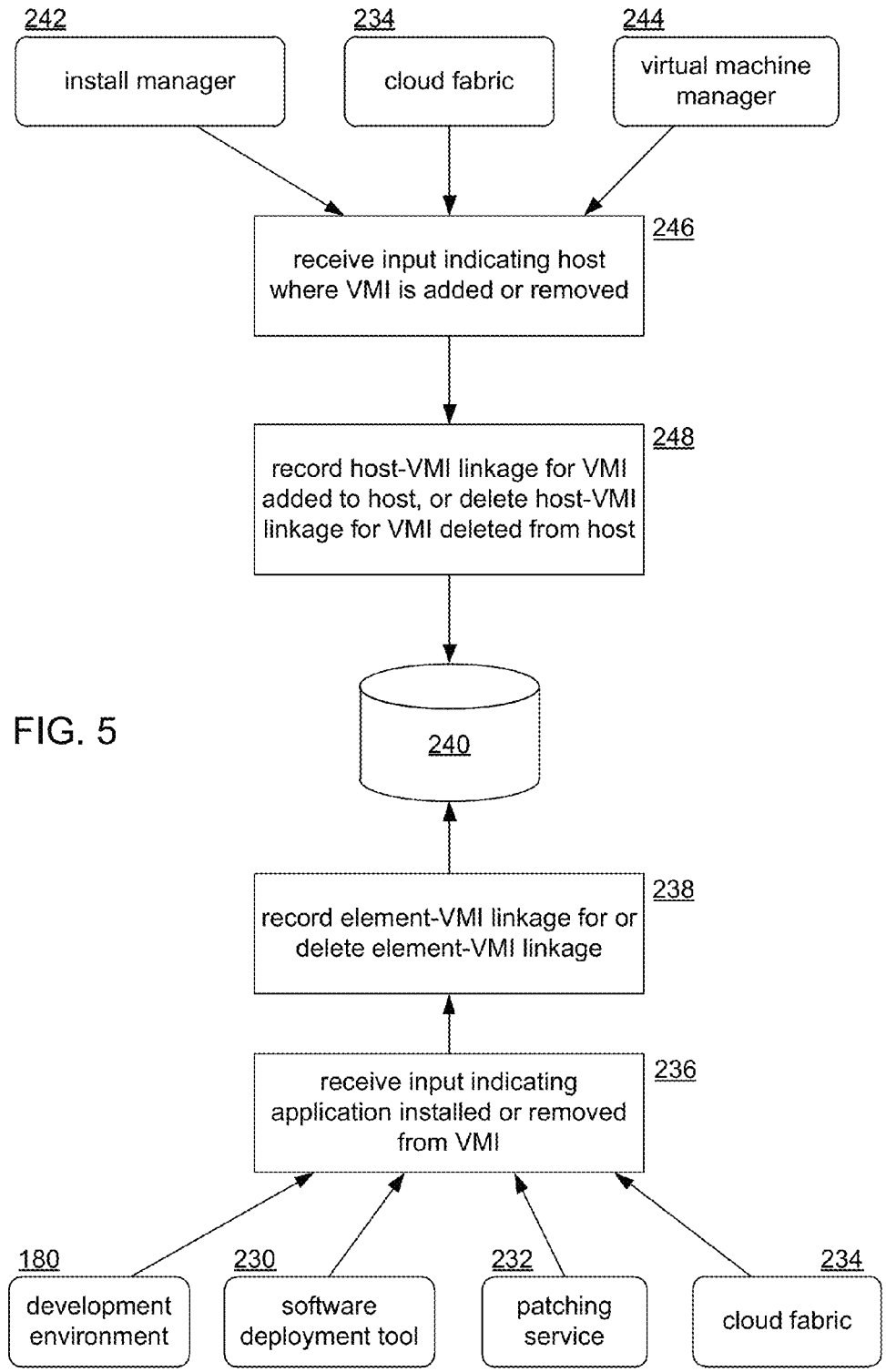
FIG. 5 shows a system for tracking the lineage of application elements and VMs.

FIG. 5 shows a system for tracking the lineage of application elements and VMs. The lower part of FIG. 5 illustrates ways to track which application elements are installed on which VMIs. The upper part of FIG. 5 illustrates ways to track which VMs (and/or hosts) are using which copies of the VMIs. Together, it is possible to track which application elements are currently executing or available to execute on which hosts and in which VMs. The steps in FIG. 5 may be performed by one or more computers, details of which are not significant. For example, such computers may be development platforms, VM management servers, or others.

Regarding the tracking of application elements on VMIs, any of a variety of techniques may be used to track which applications 192 (and application elements) are installed on which VMIs 140. In one embodiment, the development environment 180 not only builds applications but is configured to build VMIs and install applications on VMIs. The development environment 180 may issue a signal or message when a new VMI is created and when an application is installed on a VMI. In another embodiment, a software deployment tool 230 takes a specified VMI (e.g., a VHD file), mounts the VMI to access its file system, and installs the application from deployment package. At that time, the software deployment tool 230 may issue a communication that indicates the application installed and the VMI on which it was installed. In another embodiment, a patching service 232 applies software patches to VMIs, either through an executing VM and its guest, or directly to VMIs. In yet another embodiment, a cloud fabric 234 may install an application on a VMI.

By whatever means, when an application is installed on a VMI, at step 236 input is received indicating which application is installed to (or removed from) which VMI. At step 238, this information is recorded in a lineage tracking repository 240, which is described later.

Regarding the tracking of VMIs (or VMs using copies of the VMIs) on hosts, again, a variety of means may be used. In one embodiment, an install manager 242 installs VMIs on hosts where they become VM instances. In another embodiment, the cloud fabric 234 may create a VM instance of a VMI by copying the VMI, instantiating a VM that uses the VMI, and starting the VM. In this case the cloud fabric 234 reports which VM or VMI is created/deleted on which host. A virtual machine management system may perform similar functions. In yet another embodiment, hosts may issue communications indicating which VMs are running VMIs copied from which original or base VMIs. At step 246 input is received indicating that a specific VMI (or copy thereof) has been installed (or deleted) on a specific host. For example, a host might send a network message indicating which VMs are active or available to run on the host (possibly including identifiers of the correspond VMIs). At step 248 one or more host-VMI linkages are recorded (or deleted, as the case may be) in the lineage tracking repository 240.

Figure 6:
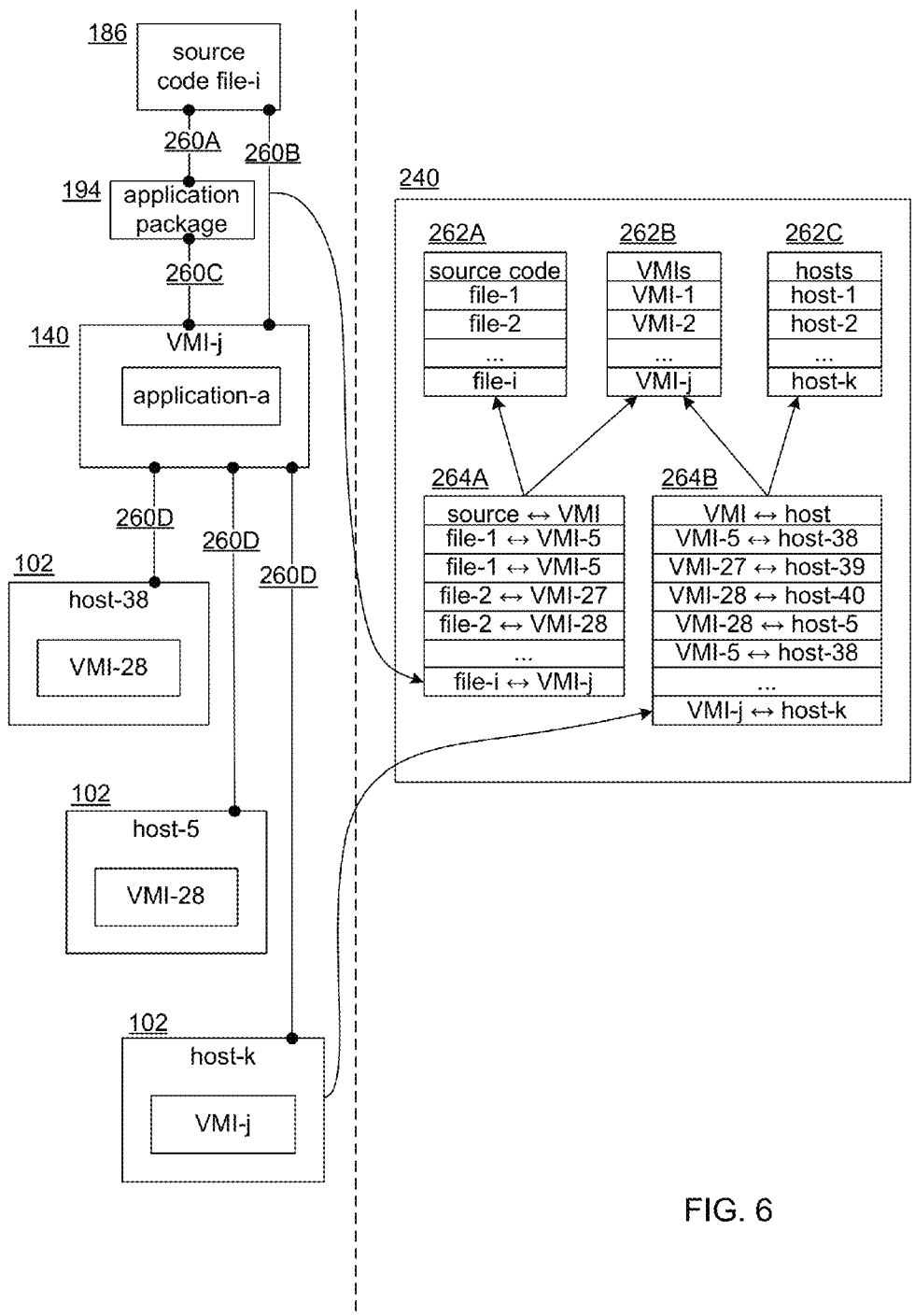
FIG. 6 shows a detailed example of a lineage tracking repository.

FIG. 6 shows a detailed example of the lineage tracking repository 240. Logical relations 260A between corresponding applications, hosts, and VMs are as discussed above. For example, logical relation 260A is the existence of an application element in an application 192 or application package 194. Logical relation 260B is the existence of an application on a particular VMI 140 and an application element (e.g., a source code file 186) from which the application was built. Logical relation 260C is the installation of a particular application or application package on a particular VMI 140 (e.g., VMI-j). Logical relations 260D are the existence of particular VMs (and/or VMIs) on particular hosts, where the VMs use copies of a particular VMI. For the purpose of lineage tracking, a VM using a copy of a particular VMI will simply be referred to as a VMI (to indicate that the VM uses a particular VMI). However, in practice, VMIs, though copied from an original, will start to differ from the original as they are executed by VMs. The logical relations depicted on the left side of FIG. 6 are represented by stored information as depicted on the right side of FIG. 6.

On the right side of FIG. 6, the lineage tracking repository 240 stores information indication which components can be traced to which other components. A series of tables store links between the components. Tables 262A, 262B, and 262C store information identifying the components. A source code table 262A stores identifiers of existing source code files (or other application elements). The source code table 262A may also or alternatively store information indicating which application elements correspond to which applications (for discussion, where an application element or source code files is mentioned in FIG. 6, an application built therefrom may be used as well). In one embodiment, table 262A may store application manifest files or other files that indicate the application elements of applications. The table 262A may also provide metadata about application elements, such as when they were created or last revised, their current revision number, the developer who authored the application elements, etc.

Another table 262B stores identifiers of particular VMI files; each VMI may have a globally unique identifier. Metadata associated with a VMI may also be stored, such as its location, its history, role, etc. Table 262C stores a list of hosts that may be running VMs including VMs using VMIs listed in table 262B. The information stored in tables 262A, 262B, and 262C may take different forms; the tables are merely used for convenience. In one embodiment, relations stored in relation tables 264A, 264B implicitly define the components they link.

Table 264A stores links between particular application elements (e.g., source code files) and particular VMIs. In one embodiment, Table 264A is implemented as a first table that indicates which application elements correspond to which applications, and a second table that indicate which applications are installed on which VMIs. When links between application elements and applications are available, it may be possible to identify which VMIs are linked to which application elements. For example, it may be possible to determine that VMI-j has application-a, that application-a is built from source code file-s, and that therefore the lineage of VMI-j is logically linked to source code file-s. Moreover, it may be possible to identify all of the VMIs that are so linked to the source code file-s.

In addition to the information linking particular VMIs to particular applications and/or application elements, a table 264B stores information linking particular hosts to deployed copies of the particular VMIs (i.e., VMs using copies of the particular VMIs). In one embodiment, the original VMIs are "golden image" VMIs, which are copied and deployed as VMs. In another embodiment, each VMI is a unique deployed VMI of a VM, and the lineage tracking repository 240 tracks which deployed VMIs have which applications and/or application elements.

In sum, the lineage tracking repository 240 may be updated when: new applications are deployed; old VMIs are taken out of service or deleted; new applications are built and installed on VMIs; new VMs are formed, etc. At any given time, the repository will substantially reflect the current set of deployed VMs and the software installed therein.

Consider the following example described with reference to FIG. 6. A source code file-i is used to build application-a. Application-a is then installed on VMI-j and VMI-28. Links in table 264A link source code file-i (and/or application-a) with VMI-j and VMI-28. VMI-j (or a copy thereof) is started with a VM on host-k, and VMI-28 is started in VMs on host-5 and host-38, respectively, and corresponding entries are made in table 264B.

Figure 7:
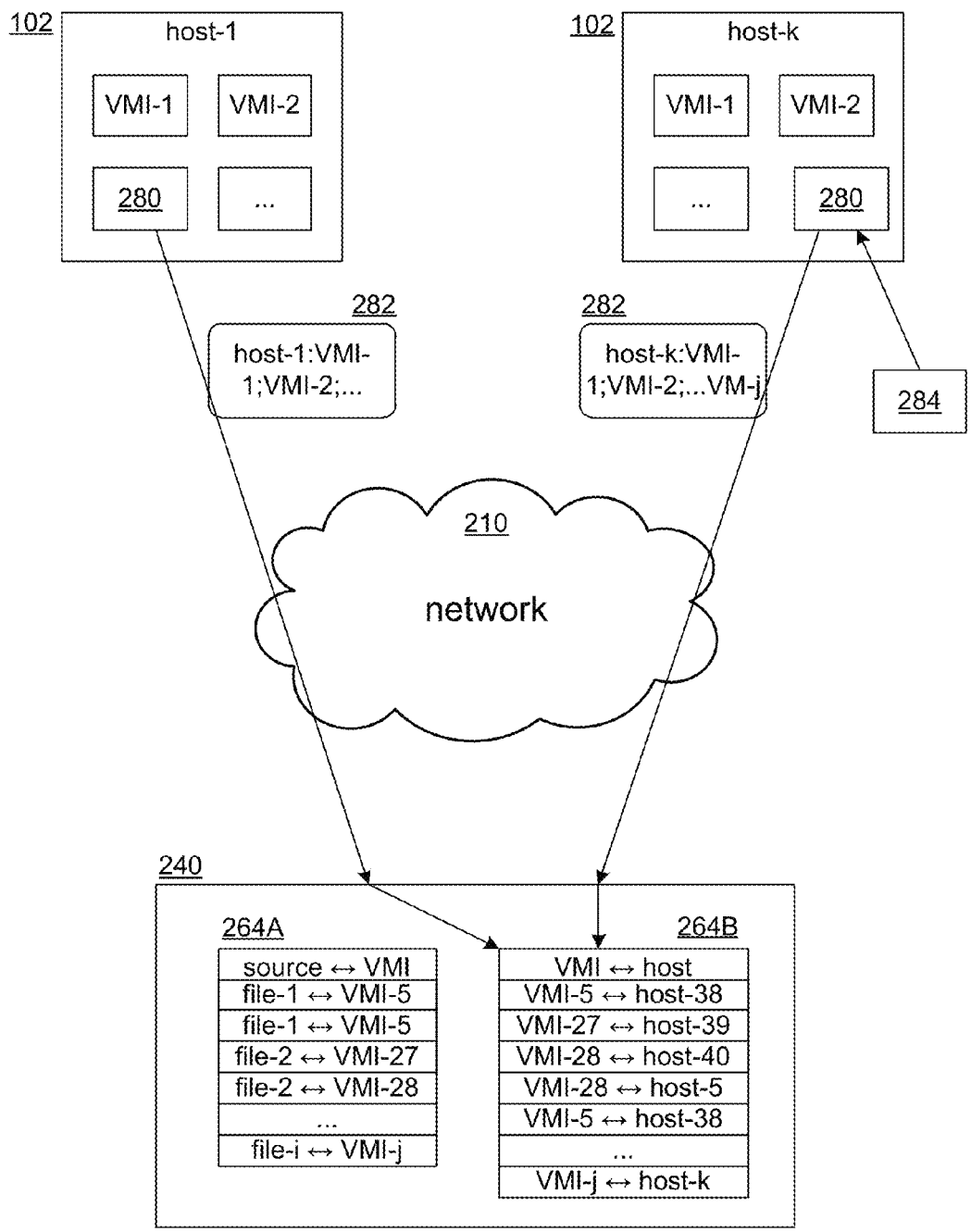
FIG. 7 shows an example of how VM instances using VMIs may be linked to particular hosts.

FIG. 7 shows an example of how VM instances using VMIs may be linked to particular hosts. Each host 102 has a VM management component 280. On a given host 102, such as host-1, the VM management component 280 looks at which VMs currently exist on the host and transmits a VM list 282 listing the VMs/VMIs on that host (possibly including statuses of the VMs, such as "running", "paused", "off", etc.). The exchange may be performed using LDAP (lightweight directory access protocol), for example. The VM list 282 might identify the sending host and include identifiers of the particular VMs executing (or available) on the host, and/or the VMIs associated with the VMs on the host. In one embodiment, the VM list 282 may simply list the set of VMIs present on the host without regard for how many or which VMs are using the VMIs.

In one embodiment, the VM management component 280 pushes out any VM changes as they occur. When a new VM instance using a VMI is created or deleted on a host, that host transmits a corresponding message. In another embodiment, a management server 282 may periodically poll the hosts and request information about which VMIs are on the hosts. In yet another embodiment, a combination of approaches are used, including pushing, pulling, recording VMIs when they are deployed or migrated, and so forth. The management server 284 or equivalent receives the VM lists 280 or other information about VMI-host associations, and stores them in the lineage tracking repository 240.

In another embodiment, if a virtualization management suite is used to manage virtual machines, and in particular to control deployment and placement of VMs, the repository may be updated by the management suite each time the suite moves a VM, adds or creates a new VM, deploys a VM, deletes a VM, changes a VMs operational state, and so forth.

Figure 8:
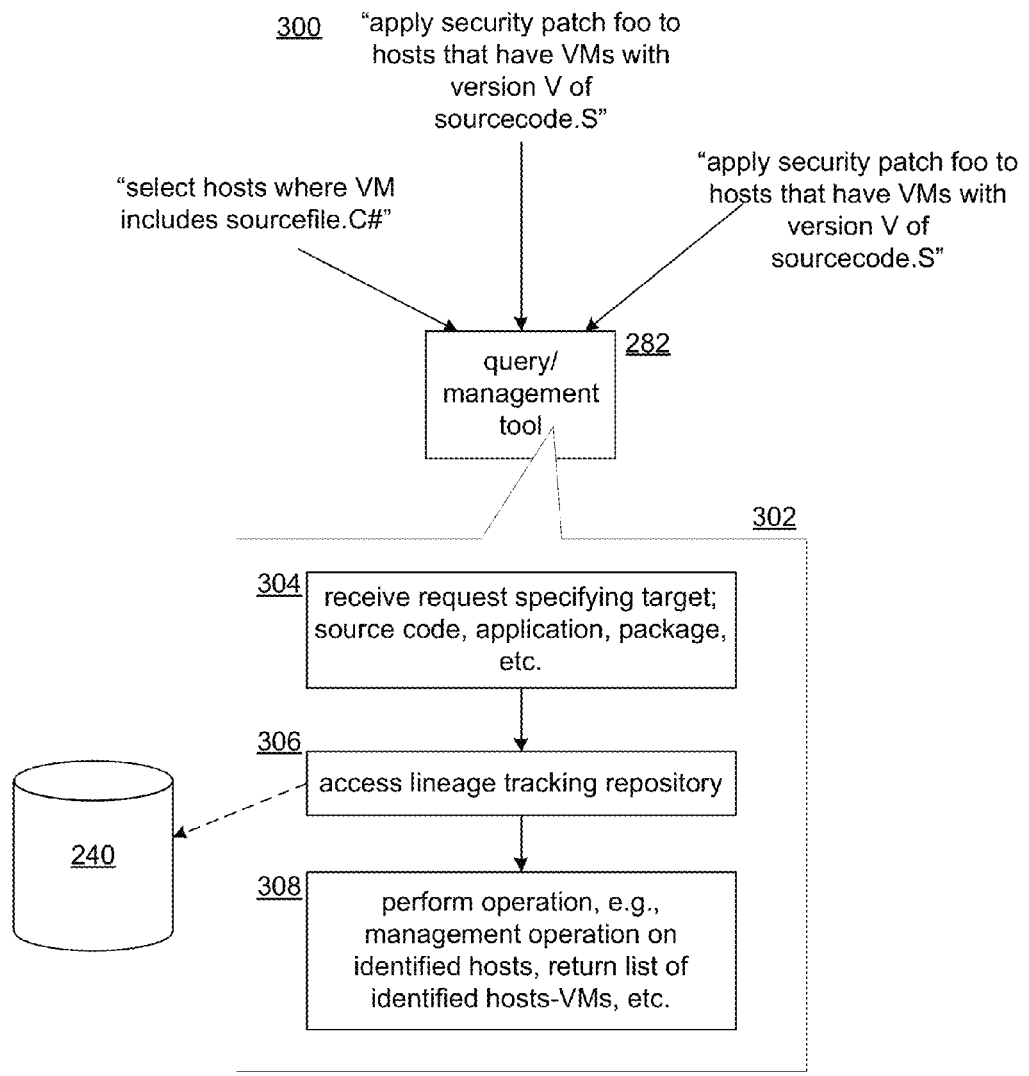
FIG. 8 shows how the lineage tracking repository may be used to obtain information about relationships between components in an environment where VMs are used.

FIG. 8 shows how the lineage tracking repository 240 may be used to obtain information about relationships between components in an environment where VMs are used. For discussion, steps may be performed by the management server 284, although any known technology for information storing and querying may be used. The management server 284 may handle requests 300, shown in plain English for convenience, but understood to be implemented using SQL (structured query language), an protocol-based application programming interface (API), or the like. A process 302 for handling requests 300 starts at step 304, where a request 300 is received. The request 300 may specify a set of information to be returned, such as "hosts", or "VMIs", or "application elements". A request 300 may instead specify a command to install a VMI, shut down a VM, reboot a host, etc. A request 300 may also specify a condition, such as "where VMI=VMI-k", or where "where running VM uses VMI-k", or "where VM has source code file-f", etc. At step 306 the lineage tracking repository 240 is accessed and condition is evaluated against the repository. At step 308 an operation is performed based on the content retrieved from the lineage tracking repository 240. Some examples will now be described.

A request 300 might be intended to identify all hosts having VMs that have software installed that includes or was compiled with a source code file specified in the request 300. The request is translated into a query, for example a JOIN between tables 264A and 264B, and the query is executed. The result is a list of hosts that have VMs that are linked to the source code file.

A request 300 might request the identities of all of the source code files or applications modified in the last month that are on a host or set of hosts defined in the request 300. For example, the request the applications and/or source code files on all hosts that have experienced an unexpected reboot in the last 24 hours (assuming such information is tracked). By using (e.g., intersecting) the appropriate sets of links (e.g., VM-VMI links, VM-hosts links, application/element-VMI links, etc.), it is possible to identify the subset of hosts with the specified files.

A request 300 might also be formed as or coupled with a command. For example, a set of VMs, hosts, etc., may be identified, and that set may be passed to a VM management system to perform a management operation, such as shutting down VMs, changing VM settings, etc. Any known type of VM operation may be provided with parameters obtained from the lineage tracking repository 240.

Requests might also be used for other purposes, such as finding which VMs have out-of-date version of applications, which application elements are in common among a set of specific VMs (e.g., VMs with a specific condition or a user-specified list of hosts or VMs).

Implementation details provided above may be varied significantly while still allowing for tracking lineage of VMs. Generally, any means of automatically linking VMs to the assets thereon may be used. For example, the lineage of a VM can be automatically discovered or inferred by inspecting the VM's virtual machine disk image. When certain application elements are found to be present in a VM, e.g., specific dynamically loaded libraries, configuration files, binary executables having specific version numbers, etc., that VM can be linked to other VMs. What is notable is that as VMs are deployed, cloned, deleted or shutdown, and so forth, links between the VMs and the software thereon are maintained. Moreover, details of the makeup of the software may also be tracked. By using a relational data model it is possible to perform efficient searches, however other models may be used.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computers to track virtual machine images (VMIs) deployed on hosts, respectively, the method comprising:
automatically maintaining linking information that links application elements to the hosts, the linking information comprising element linkage information indicating which of the application elements were used to build or compile which of the applications, the linking information further comprising application linkage information indicating which of the applications are installed on which of the VMIs, the linking information further comprising VMI linkage information indicating which of the VMIs reside on which of the hosts, the application elements comprising source code files not present on the VMIs, wherein the applications comprise binary executable files executable within the VMIs, and wherein the VMIs are executed as virtual machines by hypervisors on the hosts, respectively; and
responding to queries identifying respective source code files by, for a given query for a given source code file, accessing the linking information, using the element linkage information to identify any of the applications that were used to build or compile the given source code file, using the application linkage information to identify any of the VMIs having any of the identified applications installed thereon, and by using the VMI linkage information to identify any of the hosts hosting any of the identified VMIs, wherein a reply to the given query comprises indicia of the identified hosts.

2. A method according to claim 1, further comprising, maintaining the linking information by, when a VMI instance is created or deleted or migrated, updating the VMI linkage information accordingly.

3. A method according to claim 1, further comprising automatically updating the linking information when an application is installed on a VMI.

4. A method according to claim 1, further comprising receiving a request specifying a host and using the linking information to identify any of the application elements that correspond to the host.

5. A method according to claim 1, further comprising automatically updating the element linkage information when an application is used to compile or build an application.

6. A method performed by one or more computing devices, the method comprising:
   executing virtual machines (VMs), comprised of virtual machine images (VMIs), respectively, on a plurality of hosts, each VMI having one or more applications installed thereon, each application having been compiled from one or more application elements comprising source code files, the applications comprising respective binary executables that can be executed by guest operating systems of the respective VMs;
   as VMs are added to and removed from the hosts, maintaining queryable relation information indicating which of the application elements are related to which of the VMs currently available on the hosts; and
   receiving queries identifying respective source code files, and using the queryable relation information to, for a given query for a given source code file, according to an indication of the given source code file, identify from the queryable relation information any of the hosts hosting any of the VMs hosting any of the applications that were compiled with the given source code file has been installed, wherein the identifying identifies the hosts without regard for which of the applications are installed thereon.

7. A method according to claim 6, further comprising:
   as applications are installed in VMIs, automatically updating the relation information to include information about application elements of which the applications are comprised.

8. A method according to claim 6, further comprising receiving a first request identifying a VM and using the queryable relation information to identify source code files of applications installed on the identified VM.

9. A method according to claim 6, further comprising, based on a given application element, identifying all of the VMs among the plurality of hosts that have an application that corresponds to the application element.

10. A method according to claim 6, further comprising updating the relation information each time a VM is added to or removed from one of the hosts.

11. A method according to claim 6, further comprising updating the relation information when applications on the VMIs are installed or uninstalled.

12. A method according to claim 6, wherein the queryable relation information comprises information relating application elements with applications, applications with VMIs, VMIs with VMs, and hosts with VMs.

13. A method according to claim 12, wherein the information relating application elements to applications comprises information indicating: which application elements were used to build which applications, which of the applications are installed on which of the VMIs, which of the VMs are using copies of which of the VMIs, and which of the hosts are hosting which of the VMs.

14. A method according to claim 6, further comprising automatically updating the queryable relation information when an application element is used to build or compile an application.

15. An apparatus comprising a memory storing information to enable one or more computers to perform a process, the process comprising:
   compiling source code files into executable applications and maintaining corresponding application-file linkage information indicating which of the source code files were used to compile which of the applications;
   building virtual machine images (VMIs) by installing the applications on the VMIs, and storing VMI-application linkage information indicating which of the applications are installed on which of the VMIs;
   with the VMIs serving as templates, creating pluralities of VMs from copies of the VMIs, respectively;
   in a network of hosts running the VMs, for each VM created by copying from a corresponding VMI, maintaining VMI-host linkage information by tracking which of the hosts have VMs based on which of the VMIs and updating the VMI-host linkage information accordingly; and
   receiving a query for any arbitrary hosts that correspond to a source code file identified by the query, using the application-file linkage information to identify all applications in the application-file linking information that were compiled with the source code file, using the identified applications in combination with the VMI-application linkage information to identify any of the VMs having any of the identified applications thereon, and using the identified VMs in combination with the VMI-host linkage information to identify all of the hosts in the VMI-host linkage information that corresponding to the query.

16. An apparatus according to claim 15, the process further comprising: automatically updating the VMI-application linkage information when new VMIs are built.

17. An apparatus according to claim 15, the process further comprising:
   automatically updating the VMI-host linkage information as VMs are added to hosts and removed from the hosts, whereby the VMI-host linkage information reflects a current state of VMI deployment on the hosts.

18. An apparatus according to claim 15, wherein the tracking comprises inspecting a VM to determine whether specified application elements are present in the VM, and linking the VM accordingly.

19. An apparatus according to claim 15, the process further comprising automatically updating the application-file linkage information in accordance with a source code file being used to compile an application.

* * * * *